United States Patent [19]

Hartless et al.

[11] Patent Number: 6,032,048
[45] Date of Patent: Feb. 29, 2000

[54] METHOD AND APPARATUS FOR COMPENSATING FOR CLICK NOISE IN AN FM RECEIVER

[75] Inventors: Mac L. Hartless, Forest; David W. Brown, Concord; David P. Cullen, Lynchburg, all of Va.; John V. Hughes, Carbondale, Ill.; Darryl W. Royster, Lynchburg, Va.

[73] Assignee: Ericsson Inc., Research Triangle Park, N.C.

[21] Appl. No.: 08/818,284

[22] Filed: Mar. 17, 1997

[51] Int. Cl.[7] .................................................. H04B 15/00
[52] U.S. Cl. ............................. 455/506; 455/63; 455/312
[58] Field of Search .................................. 455/222, 223, 455/63, 65, 296, 506, 213, 310, 312, 297, 102, 226.1, 307; 342/91; 381/94.8; 375/346, 351

[56] References Cited

U.S. PATENT DOCUMENTS

| | | | |
|---|---|---|---|
| 3,668,702 | 6/1972 | Jones | 342/91 |
| 4,480,335 | 10/1984 | Kishi | 455/222 |
| 4,704,736 | 11/1987 | Kasser | 455/213 |
| 4,742,570 | 5/1988 | Ichikawa | 455/312 |
| 4,893,349 | 1/1990 | Eastmond et al. | 455/506 |
| 4,922,549 | 5/1990 | Johnson et al. | 455/226.1 |
| 4,955,083 | 9/1990 | Phillips et al. | 455/102 |
| 4,965,854 | 10/1990 | Glazebrook | 455/295 |
| 5,054,078 | 10/1991 | Schorman et al. | 455/297 |
| 5,140,704 | 8/1992 | Ueno | 455/296 |
| 5,170,489 | 12/1992 | Glazebrook | 455/296 |
| 5,214,391 | 5/1993 | Serizawa et al. | 455/312 |
| 5,226,088 | 7/1993 | Winterer et al. | 381/94.8 |
| 5,249,233 | 9/1993 | Kennedy et al. | 455/65 |
| 5,459,750 | 10/1995 | Hiotakakos et al. | 455/296 |
| 5,678,221 | 10/1997 | Cahill | 455/312 |
| 5,794,136 | 8/1998 | Buchwald et al. | 455/222 |

FOREIGN PATENT DOCUMENTS

| | | |
|---|---|---|
| 0 477 463 A1 | 4/1992 | European Pat. Off. . |
| 2 234 354 | 1/1991 | United Kingdom . |
| WO 94/26036 | 11/1994 | WIPO . |
| WO 98/59414 | 6/1998 | WIPO . |

OTHER PUBLICATIONS

William C.Y. Lee, *Mobile Communications Engineering*, McGraw–Hill Co., 1982, pp. 224–226.

Harry L. Van Trees, *Detection, Estimation, and Modulation Theory*, John Wiley & Sons, New York, pp. 96–99.

*Primary Examiner*—Dwayne D. Bost
*Assistant Examiner*—Quochien B. Vuong
*Attorney, Agent, or Firm*—Nixon & Vanderhye P.C

[57] ABSTRACT

These and other objects of the present invention are achieved using an Adaptive Multi-Path Filter (AMPF) which eliminates audibly objectionable click noise generated at the output of an FM discriminator to prevent audible distortion or other corruption of the desired signal which may include voice and low speed digital data. Clicks are detected at the discriminator output using a colored-noise, matched filter designed and adapted to the click signature/shape as well as to the desired signal characteristics. The colored-noise matched, filter output is then compared to an adaptive threshold. When the threshold is exceeded, a click is registered as detected. Click duration is then estimated. An estimate of the desired signal is generated and that replaces the originally received data signal estimate within the click duration region. Using characteristics of the desired signal just before and after the detected click noise, the adaptive filter accurately estimates the parameters of the desired signal so that the replacement signal fairly models what the desired signal would have looked like had the click not occurred. In this way, a substantial portion of the desired signal is preserved.

31 Claims, 8 Drawing Sheets

METHOD AND APPARATUS FOR COMPENSATING FOR CLICK NOISE IN AN FM RECEIVER

FIELD OF THE INVENTION

The present invention relates to frequency modulation (FM) receivers, and more particularly, to compensating for clicks, caused for example by multi-path effects, in the radio audio output generated by FM receivers.

BACKGROUND OF THE INVENTION

In mobile telephony, radio paths are not optimized as they are in line of sight (LOS) microwave and satellite communications that have fixed sites selected for optimal propagation. Mobile systems introduce additional variables including radio motion, obstacles, and a third dimension. Indeed, a mobile radio terminal may be moving at high speeds in an automobile. But even if the terminal is temporarily fixed, that location may be anywhere within a serving area of interest. A stationary terminal user moving a hand-held terminal during a conversation introduces "micromotion" as well. The end result is that the characteristics of the radio communications path are constantly changing.

Multi-path propagation therefore is the rule in mobile telephony. Consider the simplified multi-path pictorial model in FIG. 1. Multiple rays $P_1$, $P_2$, $P_3$, from radio 10 reach the receive antenna of the mobile radio 12 each with its own delay. Moreover, RF energy arrives on the receive antenna reflected off the sides of buildings, streets, lakes, the atmosphere, and so on as well as diffracted by both edge-type structures like building corners and rounded obstacles like water tanks and hilltops.

Because the same signal arrives over several paths, each with a different electrical length, the phase of the signal over each path is different, resulting in complicated constructive and destructive amplitude fading. Fades of 20 dB are common, and even 30 dB fades can be expected.

Analog FM mobile radio receivers employ FM discriminators to convert a changing frequency or phase into a corresponding appropriate voltage signal to drive a speaker. To make this kind of conversion, signal discriminators are sensitive to changes in slope and phase of the received signal. However, as a mobile unit moves, the received signal fluctuates in both amplitude and phase. Multi-path fading in particular causes fluctuations in phase that generate short bursts of noise. These noise bursts at the output of the FM discriminator are sometimes referred to as random FM noise or "click noise."

To understand the click noise phenomena, consider a received signal as a phasor or vector $Re^{j\phi_R}$ in the complex domain having an amplitude R and a phase angle $\phi_R$. Vector R has two vector components: $re^{j\phi_R}$ represents the fading signal but nevertheless desired signal and $ne^{j\phi_R}$ corresponds to the additive noise. Since the fading changes very slowly compared with the noise, the resulting vector R appears to rotate rapidly about the point where the two vector components intersect. Occasionally vector R sweeps around the origin when r<n which causes the phase angle $\phi_R$ to increase or decrease by $2\pi$ radians or 360° C. Such dramatic and sudden phase increases/decreases produce spike-type impulses that correspond to "clicks."

An example of a click output from a discriminator is shown in FIG. 2. When this kind of click impulse is applied to one or more low pass filters, such as is found in the audio processing portion of FM receivers, a corresponding but wider impulse response is produced as shown in FIG. 3. In addition, a "ringing" waveform that precedes and follows the relatively narrow click pulse to effectively substantially enhance the distorting effect of the click. In physical terms, click noise is generated at the FM discriminator output when the radio experiences a fade that causes a rapid phase change of $2\pi/360°$.

The problem is how to detect and minimize the impact of these undesirable clicks. One crude approach might be to use a simple high pass filter followed by a gain reduction stage to minimize the audible effect of the click. But unless the high pass filter is tuned to the shape of the click or to the frequency characteristics of the desired received signal, it is difficult to detect and attenuate just the click itself. As a result, the desired signal may be attenuated rather than the click. Moreover, the click may not be sufficiently attenuated to minimize its undesirable effects.

Even assuming a click can be accurately detected, removing the click using a squelch or noise blanking circuit destroys desired information present along with the detected click. This problem is particularly troublesome if the desired information includes both voice and sub-audible control signals. While a loss of voice may not be noticed or its absence tolerated, such a loss may not be as well tolerated when the controls signals include low speed digital data.

SUMMARY OF THE INVENTION

It is an object of the present invention to provide a solution to the above-identified problems using an adaptive filter.

It is an object of the present invention to provide an adaptive filter that effectively removes noise at a radio receiver resulting from multi-path fading while at the same time preserving a substantial portion of desired signal information.

It is another object of the present invention to eliminate audible click noise while still preserving audible and sub-audible signal components in the desired signal.

It is still a further object of the present invention to provide an adaptive filter that is designed based on the signature or shape of the FM click noise as well as the frequency characteristics of the desired signal in order to accomplish the above objects.

These and other objects of the present invention are achieved using an Adaptive Multi-Path Filter (AMPF) which eliminates audibly objectionable click noise generated at the output of an FM discriminator to prevent audible distortion or other corruption of the desired signal which may include voice and low speed digital data. Clicks are detected at the discriminator output using a colored-noise, matched filter designed and adapted to the click signature/shape as well as to the desired signal characteristics. The colored-noise, filter output is then compared to an adaptive threshold. When the threshold is exceeded, a click is registered as detected. Click duration is then estimated. An estimate of the desired signal is generated and that replaces the originally received data signal estimate within the click duration region. Using characteristics of the desired signal just before and after the detected click noise, the adaptive filter accurately estimates the parameters of the desired signal so that the replacement signal fairly models what the desired signal would have looked like had the click not occurred. In this way, a substantial portion of the desired signal is preserved.

BRIEF DESCRIPTION OF THE DRAWINGS

The features and advantages of the present invention will be described in further detail below in conjunction with the drawings of which.

DETAILED DESCRIPTION OF INVENTION

In the following description, for purposes of explanation and not limitation, specific details are set forth, such as particular circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
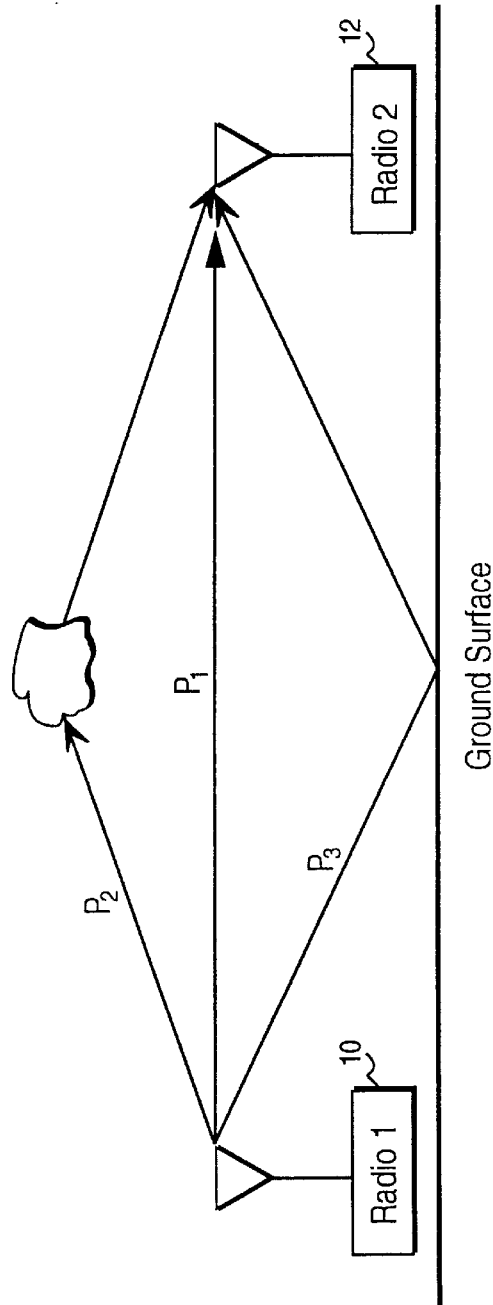
FIG. 1 is a diagram illustrating multi-path fading.
Figure 4:
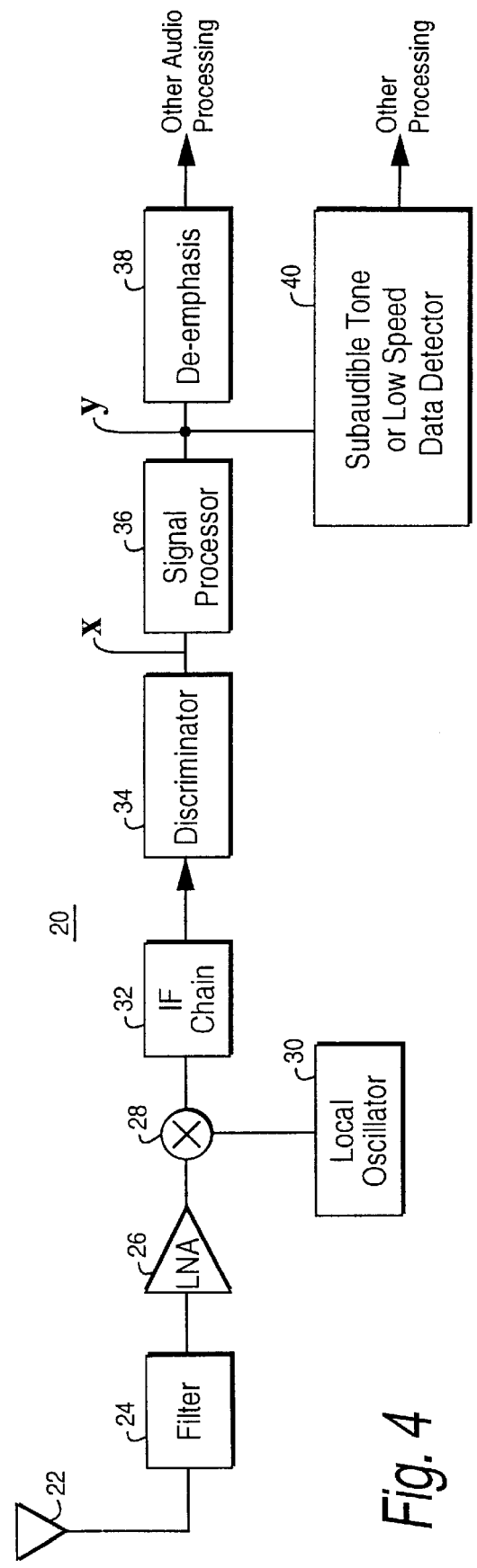
FIG. 4 is a function block diagram of a radio receiver in which the present invention may be employed.

FIG. 4 illustrates an example radio receiver 20 where the present invention may advantageously be applied. A radio frequency (RF) signal, including for example voice information and sub-audible tones or low speed data (hereafter referred to as low speed data for convenience), is received by an antenna 22 and filtered in a radio band pass filter 24. The filtered signal is then amplified in a low noise amplifier (LNA) 26 preferably designed for optimum sensitivity to the band pass signal. The amplified radio frequency signal is frequency downconverted by mixer 28 using an RF carrier generated by a local oscillator 30. Preferably, although optionally, a superheterodyne-type receiver is employed having plural stages of frequency conversion to convert from radio frequency to baseband. Accordingly, the output of mixer 28 is processed preferably in a multiple stage, intermediate frequency (IF) chain 32. The baseband signal is processed in a discriminator 34 which detects or "discriminates" at its output a signal which corresponds to the modulated information on the RF carrier (ideally). The discriminator may be analog or digital, with a digital discriminator sometimes being referred to as a phase digitizer. For a frequency modulated (FM) signal, the discriminator functions as a "differentiator" differentiating the phase of the signal received at the discriminator input with respect to time and generating a frequency output "X".

If discriminator 34 is analog, the discriminator output "X" is sampled at a particular sampling rate in signal processor 36 using an analog-to-digital converter. However, if discriminator 34 is digital, the discriminator passes digital data at a particular rate to the signal processor 36. Signal processor 36 detects the presence of a click, and if the click exceeds a threshold, the signal processor 36 replaces those clicks with an estimate of the desired received signal as is described in further detail below. Part of the desired signal output "Y" from signal processor 36 may include low speed digital data or sub-audible tones detected by low speed data detector 40. The signal processor 36 output "Y" is received by a de-emphasis stage 38 which deemphasizes higher frequencies in the audio spectrum to offset conventional emphasis in radio transmitters of higher voice frequencies. The deemphasized signal is then passed on for further audio processing to generate a voltage signal which drives a speaker in the radio.

A multi-path random noise may be generated even in a relatively strong signal environment. A fade may be experienced for example when a radio moves behind a building or under a bridge. As described above, the fade induces a rapid phase shift that causes the discriminator 34 to generate a noise spike that can be heard as a "click." The shape or signature of click noise and the frequency of click occurrence vary with the velocity with which the mobile/portable radio moves and the depth of a fade. The click signature is also a function of the sampling rate of the discriminator output.

Figure 2:
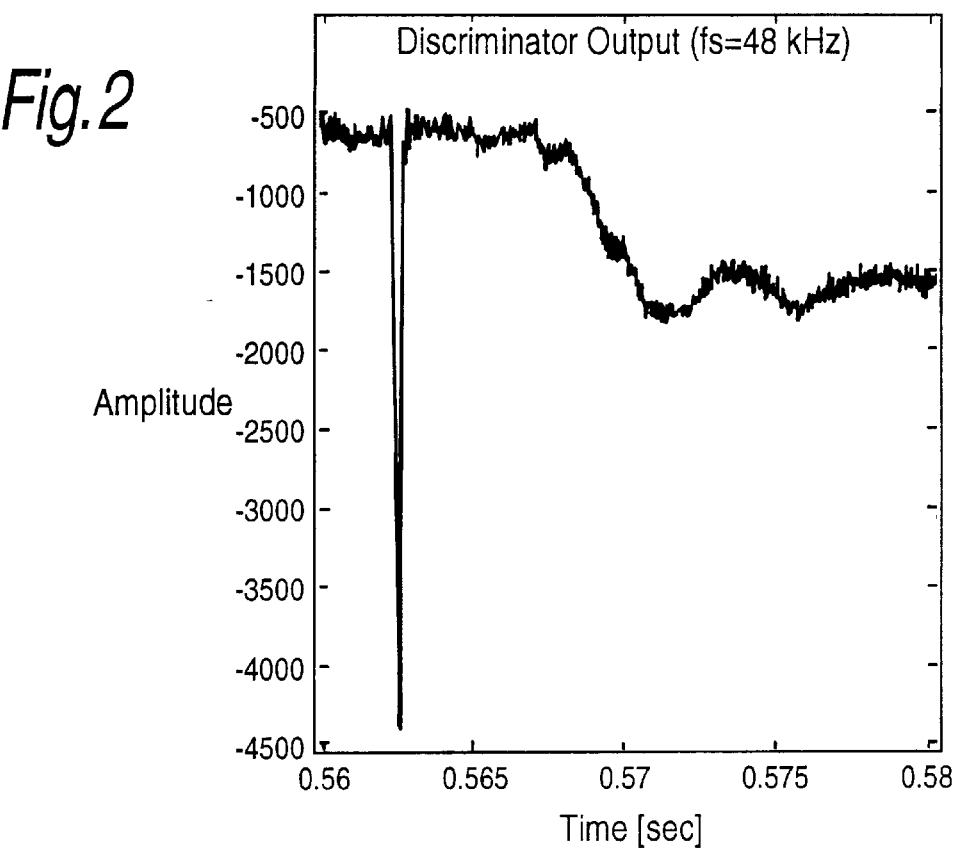
FIG. 2 is a diagram which illustrates the output of a radio receiver discriminator experiencing multi-path click noise.
Figure 3:
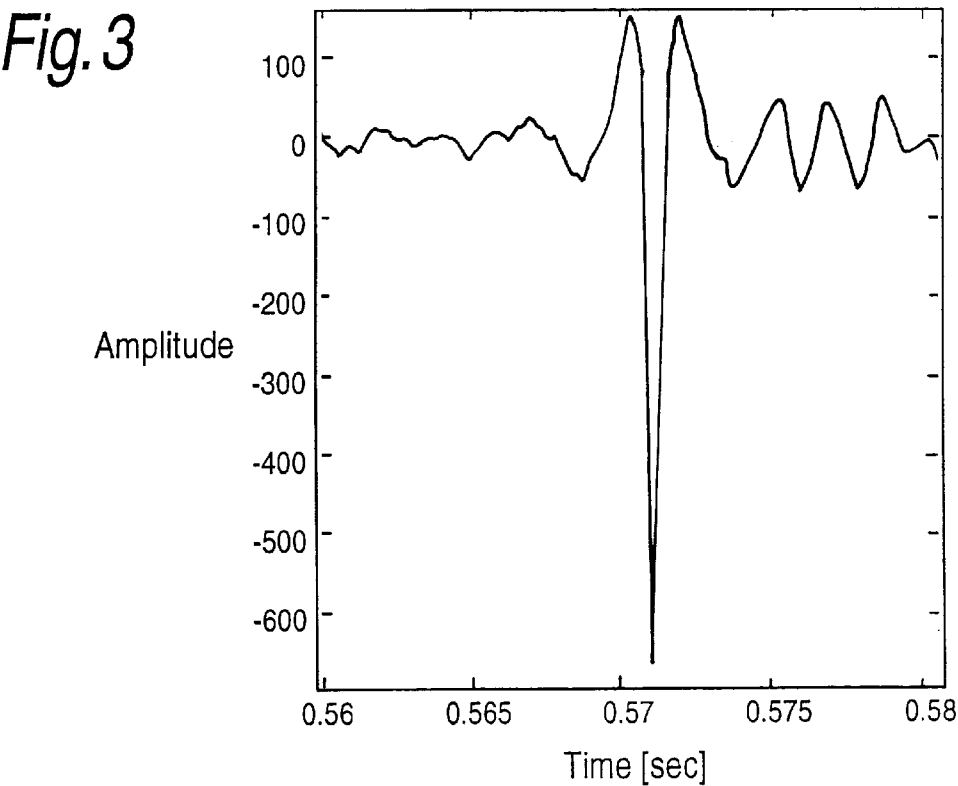
FIG. 3 is a graph showing the discriminator output including multi-path click noise after low pass filtering in conventional audio signal processing stages.

It is particularly advantageous to place the signal processor 36 directly at the discriminator output before the de-emphasis section 38 to take advantage of the relatively high sampling rate employed. As described earlier, the de-emphasis stage 38 and subsequent audio processing function as a low pass filter which spreads out the energy of the click. FIG. 2 shows a click spike which occurs shortly after 0.57 seconds. The distorting click is substantially wider with "ringing" on either side of the spread click as shown in FIG. 3. Placing the signal processor 38 after the de-emphasis block is less desirable because the time over which any click data are to be replaced is considerably longer.

The present invention takes advantage of the fact that for a large number of radio applications, the desired signal occurs in the frequency range of 0 to 3,000 Hz. Because clicks occur for only a relatively short time duration, e.g., on the order of 100 microseconds, clicks have a frequency on the order of 10,000 Hz. Therefore, the typical click frequency is relatively high compared to even the highest frequency of 3,000 Hz of the desired signal pass band. The present invention oversamples the received signal at a rate that exceeds the Nyquist frequency of the typical click signal to increase the click detection sensitivity and to obtain the additional benefits outlined below.

If the highest frequency component of the desired voice signal is 3,000 Hz, it is well known that it is theoretically possible to reconstruct a digitized version of that signal if the sampling rate is 6,000 Hz (or more). But there are drawbacks with sampling at a minimal frequency selected simply to reconstruct the baseband desired information.

First, the relatively slow sampling rate of 6,000 Hz produces aliasing with respect to the higher frequencies of the click noise causing the higher frequency click noise to fold back into the 0–3,000 Hz band. If the clicks occur on the order of 100 microseconds corresponding to a requency of 10,000 Hz, sampling should occur at 20,000 Hz or greater to prevent click noise aliasing.

Second, a lower sampling rate means that when a click is detected, the actual sample period is long compared to the click duration. Consequently, removing a sample in order to remove the click also removes more of the desired signal in that sample period than is needed to remove the click.

Third, for received signals including low speed data having a frequency on the order of 75 Hz corresponding for example to a bit width of 13.3 milliseconds, it is desirable that the sampling rate be sufficiently small so that the bit value may be readily detected after a click has been removed. If the sampling rate is too slow, there is some chance that the click might spread across two sample periods resulting in potential difficulty in reconstructing the low speed digital data waveform.

In the preferred example embodiment, oversampling occurs at a high rate, such as 48 kHz or 64 kHz to account for the relatively high frequency of click noise. As a result, the problems noted above are avoided, e.g., click aliasing is prevented and the amount of desired signal to be estimated when a click is detected is reduced.

Figure 5:
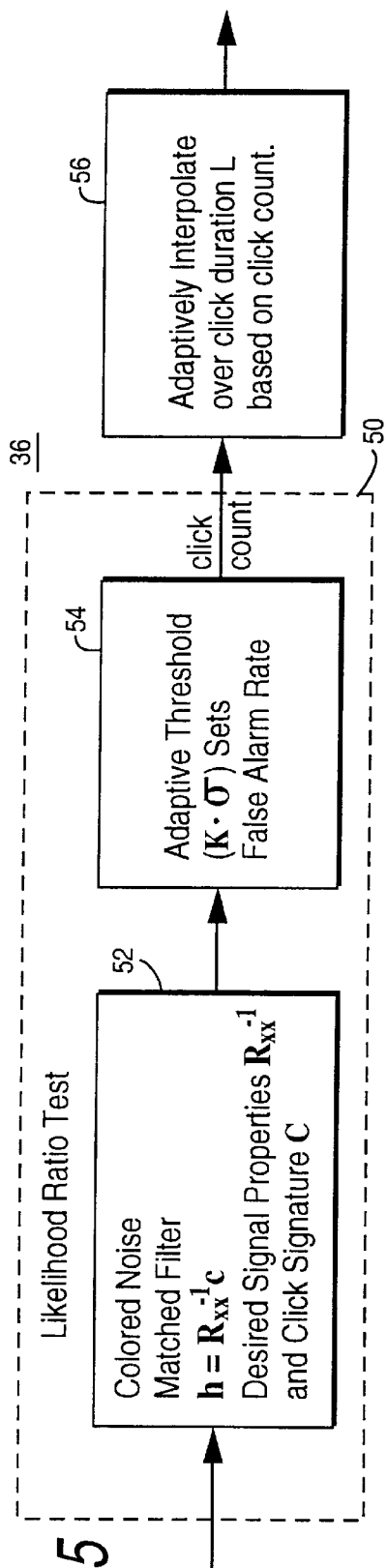
FIG. 5 is a function block diagram illustrating the principles employed in the adaptive filter of the present invention.

At a higher level, the signal processor 48 performs two general functions: detect the presence of a click, and if a click of sufficient amplitude is detected, replace the click with an estimate of the desired waveform. To detect the presence of a click, the signal processor 46 performs a likelihood ratio test 50 as indicated in FIG. 5. The general approach is to make the best decision regarding of whether a click is present based on a ratio of probability density functions. The likelihood ratio test assumes that the data is Gaussian with only the mean value changing between the hypothesis of signal present ($H_1$) and signal absent ($H_0$). The difference in mean value between the two hypotheses is defined as the click signature c. The likelihood ratio test uses the click signature c, the covariance of the received data $R_{xx}$, and the received data vector x to generate a value that is then compared to an adaptive threshold.

In detection, estimation, and modulation theory, the likelihood ratio test may be expressed mathematically in accordance with the following equation:

$$l(x) \underline{\Delta} c^T R_{xx}^{-1} x \begin{array}{c} H_1 \\ > \\ < \\ H_0 \end{array} \gamma'_* \qquad (1)$$

where $\gamma'_*$ is a threshold.

The present invention employs such a likelihood ratio test with the desired information, including both voice and low speed data, modeled as a slowly varying signal with Gaussian noise added, and the click modeled as a high frequency event with a specific waveform shape/signature. Adopting this model assumes the desired data is Gaussian with a slowly varying mean simplifies the likelihood ratio test to a colored-noise, matched filter, the output of which can be compared to an adaptive threshold. The analysis is then simplified to detecting the click signature or shape in a colored noise background that has known statistics.

A colored-noise, matched filter impulse response h is defined as follows:

$$h = R_{xx}^{-1} c \qquad (2)$$

where $R_{xx}$ is a covariance matrix of the colored noise. The covariance matrix $R_{xx}$ is a statistical quantity (a symmetric matrix) which relates the correlation of the signal with itself in time. The covariance matrix $R_{xx}$ is a function of the data "x" passed from the discriminator 34 to the signal processor 26. The vector c represents an average click waveform shape or signature. The colored-noise, matched filter 52 defined in equation (2) is designed to pass those frequencies where the click energy is higher than the desired signal energy and suppress those frequencies where the desired signal energy is greater than the click energy.

The residual signal output from the colored-noise, matched filter 52, which ideally represents only click energy, is then compared to an adaptive threshold 54 to determine whether a click is present. The adaptive threshold corresponds to a constant K multiplied by the power $\sigma$ of the incoming signal. As the input signal changes, the threshold moves. This adaptive threshold prevents detection of an excessive number of "false" clicks which would occur if the threshold were fixed or too low, e.g., below the current signal energy level.

Once a click is detected, a counter (labeled in FIG. 5 as CLK CNT) is incremented. From the number of successive clicks that occur in row and are registered in the click counter, the signal processor 26 estimates the click duration. The click duration is employed by an adaptive interpolator 56 which estimates the desired signal used to replace the detected click signal. The desired signal estimate is based on characteristics of the desired signal before and after the detected click. Data obtained at the edges of the region defined by the click counter which encompass the click are used to estimate the characteristics of the desired signal so that the data where the click occurred may be replaced with a substitute signal that represents what the desired signal would have looked like had the click not occurred.

Figure 6:
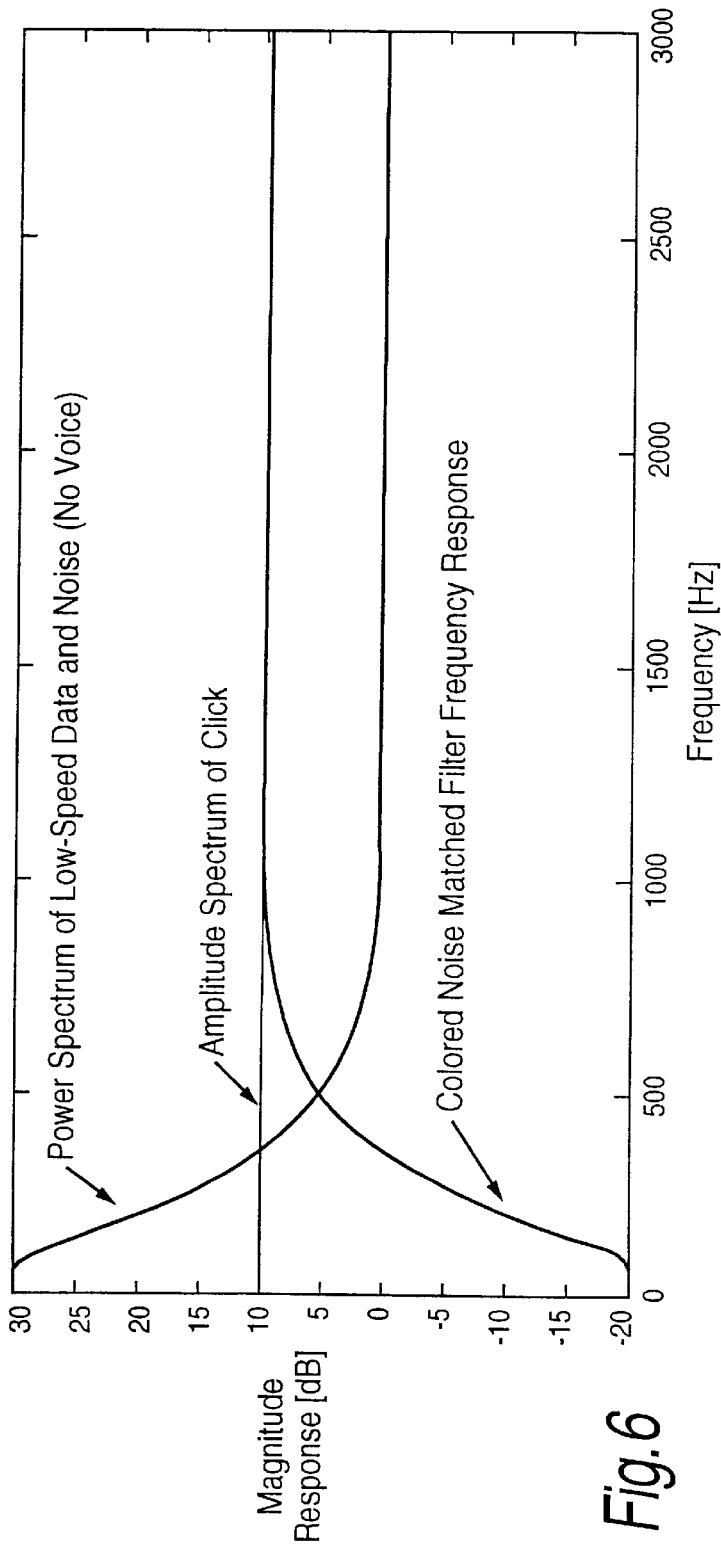
FIG. 6 illustrates an example frequency response of a colored-noise, matched filter in accordance with the present invention for the illustrated power spectrum of low speed data and noise without voice present.

FIG. 6 illustrates an example of a colored-noise, matched filter 52 in the frequency domain. The colored-noise, matched frequency filter response is essentially symmetric to and opposite that of a power spectrum of the received desired signal. In this illustration, the received desired signal includes only low speed data and white noise—there is no voice being received at the current time. Accordingly, most of the energy of the desired signal is concentrated in the frequencies less than 500 Hz which is the frequency range most attenuated by the colored-noise, matched filter. While the amplitude spectrum of the click is shown as a straight line across the entire frequency spectrum, the lower frequency portion of the click spectrum is attenuated in any region where the desired signal spectrum (e.g., voice and low speed data) is greater than the click signature spectrum. The colored noise matched filter passes those frequencies where the click energy is greater than the desired signal spectrum.

Figure 7:
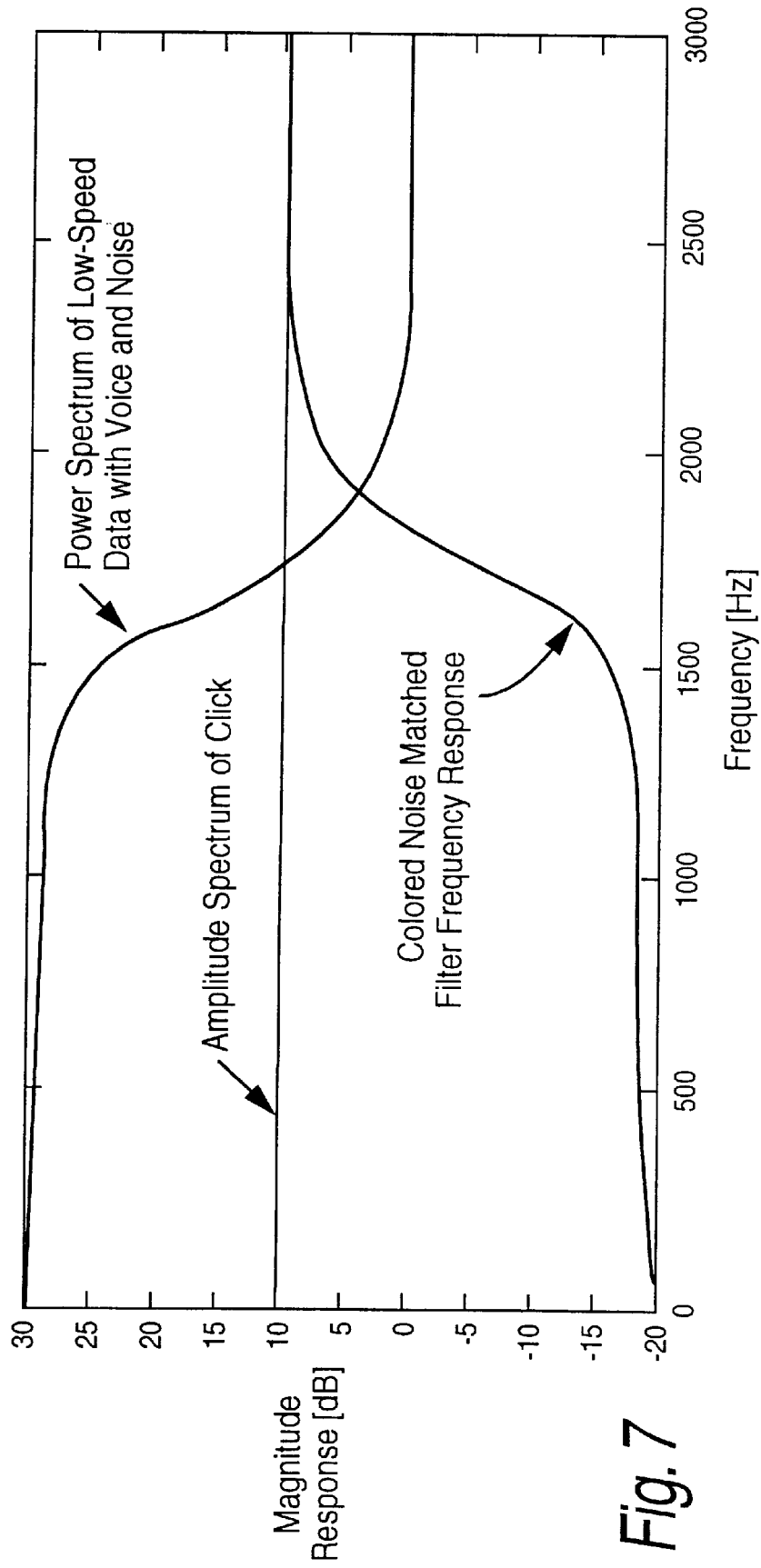
FIG. 7 is a graph of an example frequency response of a colored-noise, matched filter for the illustrated power spectrum of low speed data and noise with voice present.

FIG. 7 is a similar graph which an example of a power spectrum of a desired signal where low speed data, voice, and noise are present. The corresponding colored-noise, matched filter frequency response mirrors the power spectrum. The filter effectively models and cancels, or at least substantially attenuates, that portion of the received signal that corresponds to the desired signal (low speed data, noise, and voice if present) passing for the most part only the click.

Figure 8:
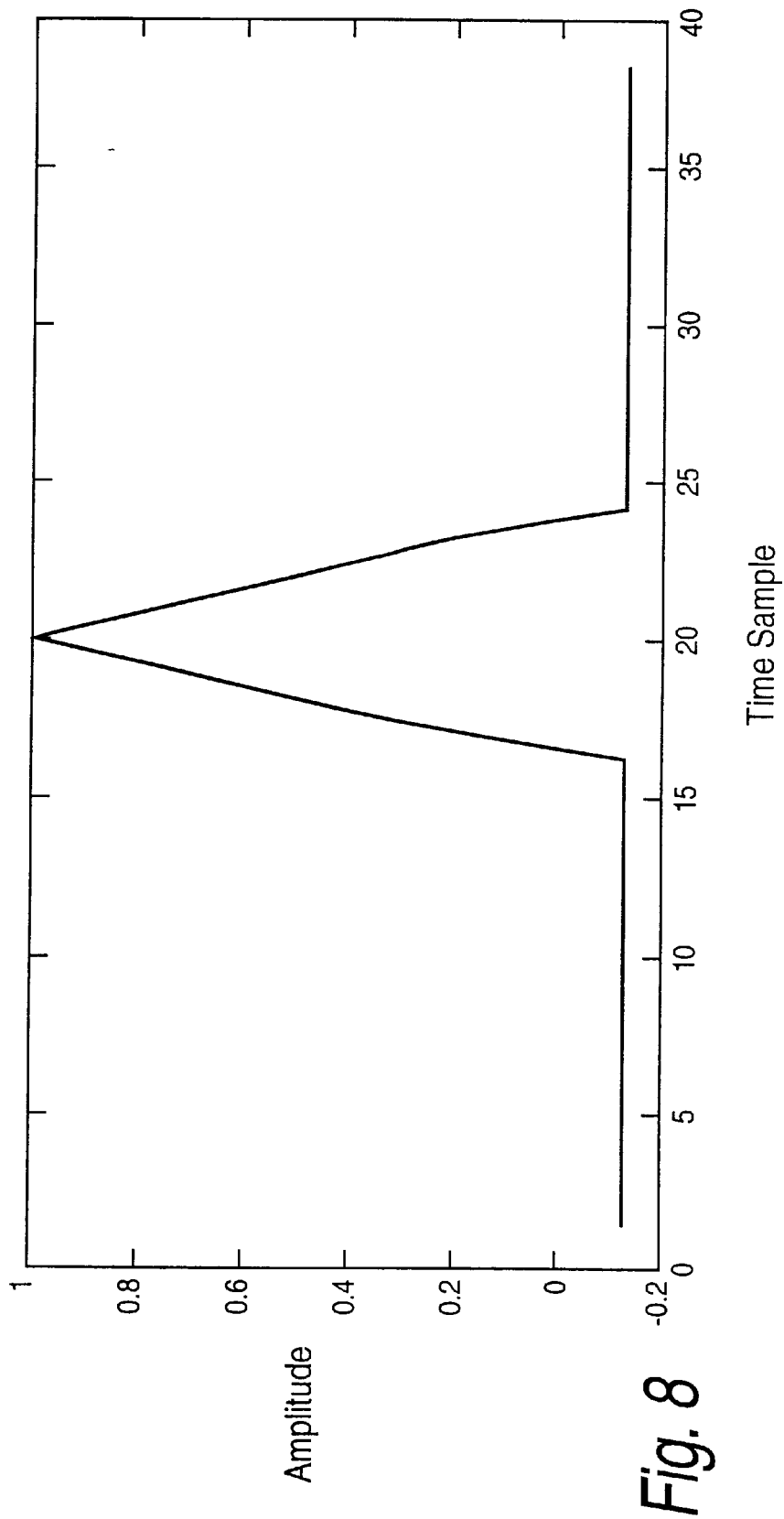
FIG. 8 is a model in the time domain of an example click noise waveform signature in the time domain.

An example of a click shape or waveform signature is shown in the time domain in FIG. 8. In the preferred example embodiment, the click signature c is estimated empirically. Data from one or more radios operated in a faded environment are gathered, and detected click waveforms for many clicks are averaged. An average click signature is generated and stored in memory. Although click signatures vary with fade depth and to some extent the sampling rate as described above, a sufficient number of different click signatures may be detected to formulate a reasonably representative average click signature such as that shown in FIG. 8.

Similarly, the desired signal characteristics $R_{XX}$ are also determined empirically using data obtained by operating one or more radios in various environments so that desired information of different types, e.g., voice with low speed data, voice without low speed data, a low pitched talking male, a high pitched talking female, no voice, etc., are received and used to estimate model characteristics of desired signals. Unlike the average click signature which is relatively predictable and static, the estimate of the desired signal characteristics changes with time since noise, voice, and low speed data are changing. Therefore, in a preferred embodiment, the desired signal estimate model $R_{XX}$ is preferably calculated in real time.

To calculate the adaptive colored noise matched filter, it is assumed that the average click signature does not change with time but that the desired signal characteristics can change with time. This requires continuously estimating the data covariance matrix $R_{xx}$. To do this in real time, an estimate of the covariance matrix $R_{xx}$ is calculated with a "fading memory" so that new data used in the covariance matrix estimate is weighted more heavily than old data. An example time length to calculate the covariance matrix estimate over might be a quarter of a second.

Figure 9:
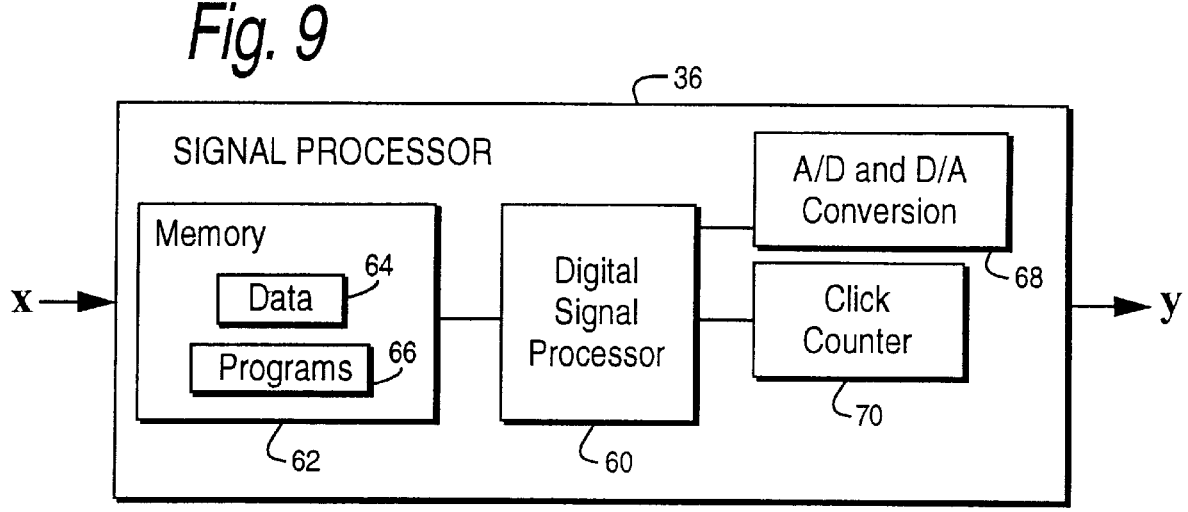
FIG. 9 is a more detailed function block diagram of the signal processor shown in the receiver of FIG. 3.

The adaptive filter shown in FIG. 5 may be implemented in signal processor 36 as a digital transversal filter having multiple taps using the digital signal processing based configuration shown in FIG. 9. In particular, digital signal processor 60 is coupled to memory 62 which stores data such as the average click signature c and the estimate $R_{XX}$ of the desired signal characteristics as well as software programs 66 such as those used to implement the flowchart routines described later in conjunction with FIGS. 11 and 12. Digital signal processor 60 may also employ analog-to-digital and digital-to-analog conversion means 68 if the discriminator 36 is an analog-type discriminator in order to convert the discriminator output into digital format. Digital signal processor 60 is also connected to a click counter 70 employed in determining duration of a detected click. While a digital signal processor configuration, such as that shown in FIG. 9, is a preferred implementation of the present invention, those skilled in the art will appreciate that the present invention may be implemented using other types of electronic circuitry such as for example an application specific integrated circuit (ASIC).

Figure 10:
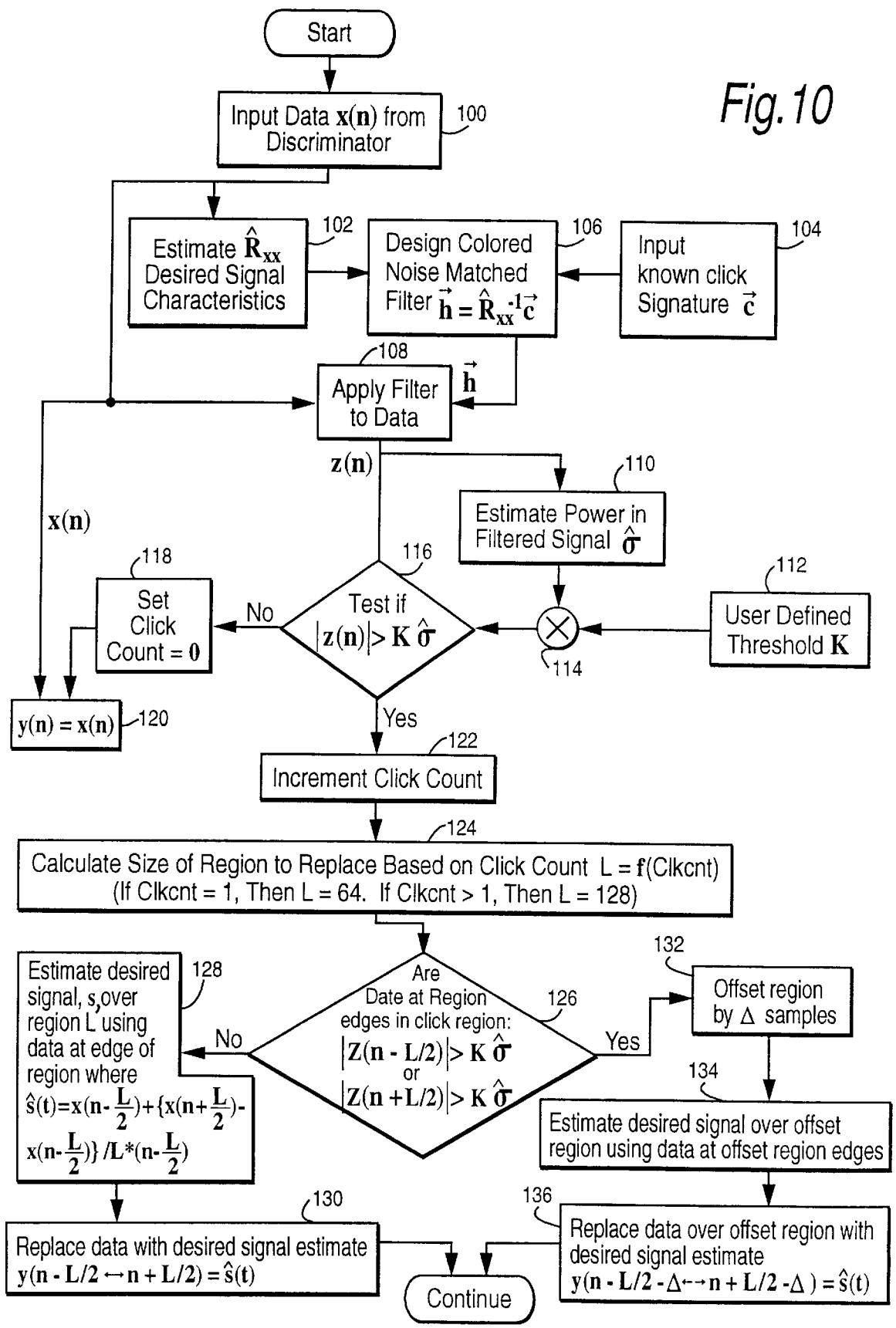
FIG. 10 is a flowchart illustrating an example procedure for implementing the present invention in accordance with a preferred example embodiment.

The procedures which are preferably carried out in implementing the present invention using for example the digital signal processor configuration shown in FIG. 9 are now described in conjunction with the flowchart illustrated in FIG. 10.

Initially, data from discriminator 34 is received for processing by signal processor 36 (block 100). The input data is identified as x(n) where n generally represents a sample of the discriminator output signal x. As mentioned above, digitized data may be received directly from digital discriminators such as a phase digitizer or digitization can take place in the signal processor using analog-to-digital conversion circuitry 68. In a preferred example embodiment, the input data is then employed in a real-time fashion to estimate empirically model characteristics $R_{XX}$ of the desired signal (block 102). The estimated characteristics of the desired signal are used in conjunction with an average click signature c provided from block 104 to design the colored-noise, matched filter in accordance with the transfer function $h=R_{XX}^{-1}c$ (block 106).

The filter transfer function h(n) is applied to the input data x(n) (block 108) to generate a colored-noise, matched filter output z(n). The colored-noise, matched filter output signal z(n) includes predominantly signal energy of any click which is present in the received input data x(n). From equation (2) above, it is understood that $$z(n)=h(n)*x(n) \qquad (3)$$

where "*" represents a convolution.

As described above, the present invention employs an adaptive threshold to avoid false click detections and/or a high frequency of click detections either of which may adversely impact the content of the received desired signal. As more clicks are detected, more of the desired signal is estimated. In order to adapt that threshold, the power of the filtered signal z(n) is estimated (block 110) using a root mean squared (RMS) type power correlation to generate an estimated power signal σ, e.g., z(n) is rectified than averaged. The estimated power signal σ is multiplied by a user defined threshold K in multiplier block 114 to provide the adaptive threshold. The user defined threshold constant K is a scaler multiplier applied to fix the probability of a false detection of a click. The constant K is determined so that the threshold rides on top of the noise level to prevent falsing on high frequency portions of the desired signal. Through empirical testing, the inventors of the present invention determined that values of K between two and seven provided satisfactory performance with the best performance being obtained when K=5. In low signal, noisy environments, the adaptive threshold Kσ automatically increases so that only a few clicks are detected and replaced.

A decision is made (block 116) whether the magnitude of the filtered signal z(n) as defined in equation (3) exceeds the threshold parameter Kσ. If not, there is a low probability that the presently received signal includes a click. Therefore, a decision is made that no click is present, and the click counter is set to zero (block 118). The signal processor 36 output signal y(n) is accordingly set equal to the input x(n) (block 120). On the other hand, if the magnitude filtered signal z(n) exceeds the threshold Kσ, a click has been detected, and the click counter is incremented (block 122). Of course, each successive filtered sample z(n) which exceeds the corresponding adapted threshold Kσ for that sample causes the click counter to increment by one.

Figure 12:
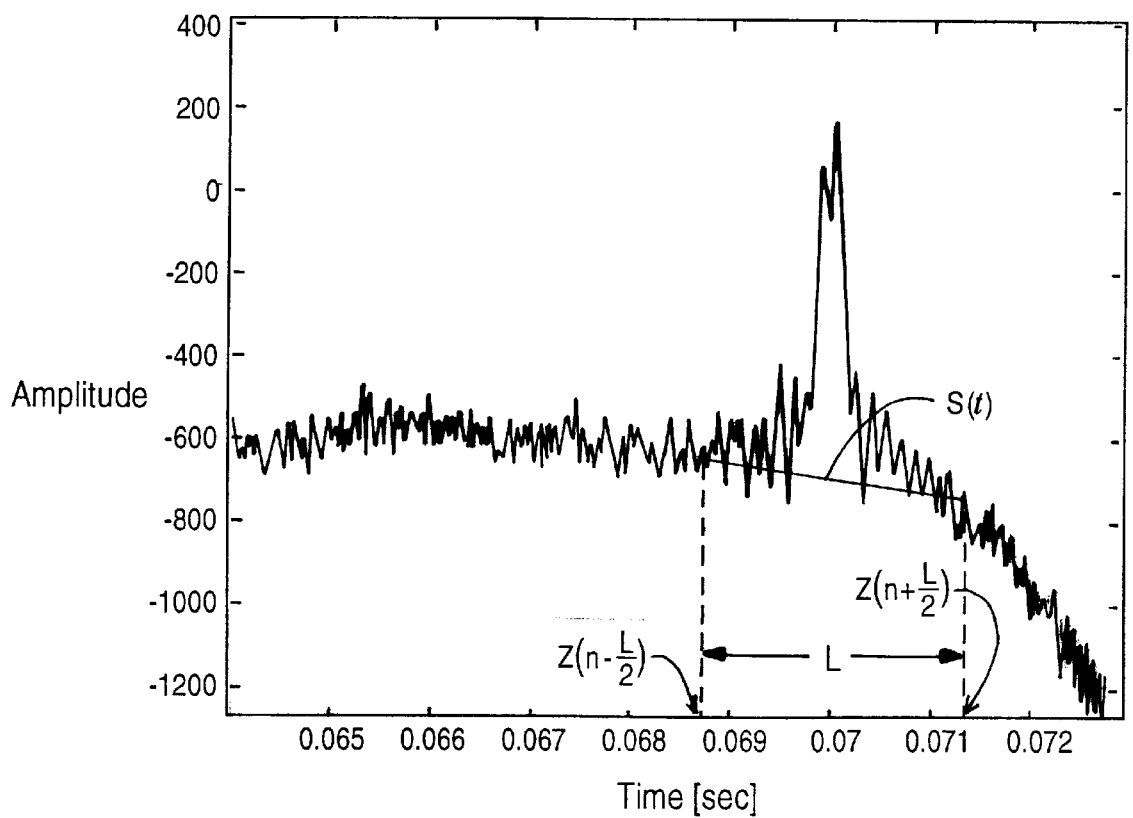
FIG. 12 is a graph showing an example click and the estimate of the desired signal which is used to replace the click.

The duration of the detected click is calculated based on the click counter value. In general, the length L of the received signal to be replaced when a click is detected is a function of click count. FIG. 12 shows an exemplary click waveform having its peak at approximately 0.07 seconds. A click replacement interval L is indicated for the detected click shown in FIG. 12. One example function for determining the length L is straightforward: if the click count equals one, then L equals 64 samples; if the click count is greater than one, then L equals 128 samples.

A decision is then made in block 128 whether the magnitude of the sampled data at the edges of the click region, which in FIG. 12 correspond approximately to locations 0.0687 and 0.0713, exceeds the click threshold Kσ. Stated more formally, the decision is made whether $$|z(n-L/2)|>K\sigma \qquad (4)$$

or $$|z(n+L/2)|>K\sigma \qquad (5)$$

This decision ensures that the edge data used to estimate the desired signal are not themselves part of a preceding or succeeding click.

Assuming the edge data at z(n−l/2) and z(n+l/2) are not in a click region, the estimated desired signal s(t) is calculated (block 128) in accordance with the following equation:

$$s(t)=x(n-L/2)+(n-L/2)[x(n+L/2)-x(n-L/2)]/L \qquad (6)$$

Equation (6) defines a simple method to estimate the slope of the signal with two end points n−L/2 and n+L/2 of the interpolation region l. Using a first order interpolation, i.e., constant slope, the signal s(t) as shown in FIG. 12 is generated which reasonably approximates the desired signal for that interval. A more elaborate procedure could be employed that estimates a higher order polynomial fit of the data over the click region. These techniques are more desirable than simply muting or blanking during the click duration because they substantially preserve the desired information with minimal distortion. Accordingly, the output y(t) of the signal processor 36 during the time period n−L/2 to n+L/2 equals the desired signal estimate s(t) (block 130).

Returing to decision block 126, if the data at the edges of the click region do exceed the click threshold, then those edge regions are deemed to be in a click region. The edges n−L/2 and n+L/2 are therefore offset by additional Δ samples making the interpolation period even longer, i.e.,g from n−L/2−Δ to n+L/2+Δ (block 132). These additional Δ samples provide insurance that the desired signal estimate s(t) is not corrupted by an adjacent click or a click of unusual duration. The desired signal is then estimated over the offset region using data at those offset region edges (block 134) in accordance with the following equation:

$$s(t)=x(n-L/2-\Delta)+(n-L/2-\Delta)[x(n+L/2-\Delta)-x(n-L/2-\Delta)]/L \qquad (7)$$

The output signal y(t) during this period of n−L/2−Δ to n+L/2−Δ is then replaced with the estimate signal s(t).

Figure 11:
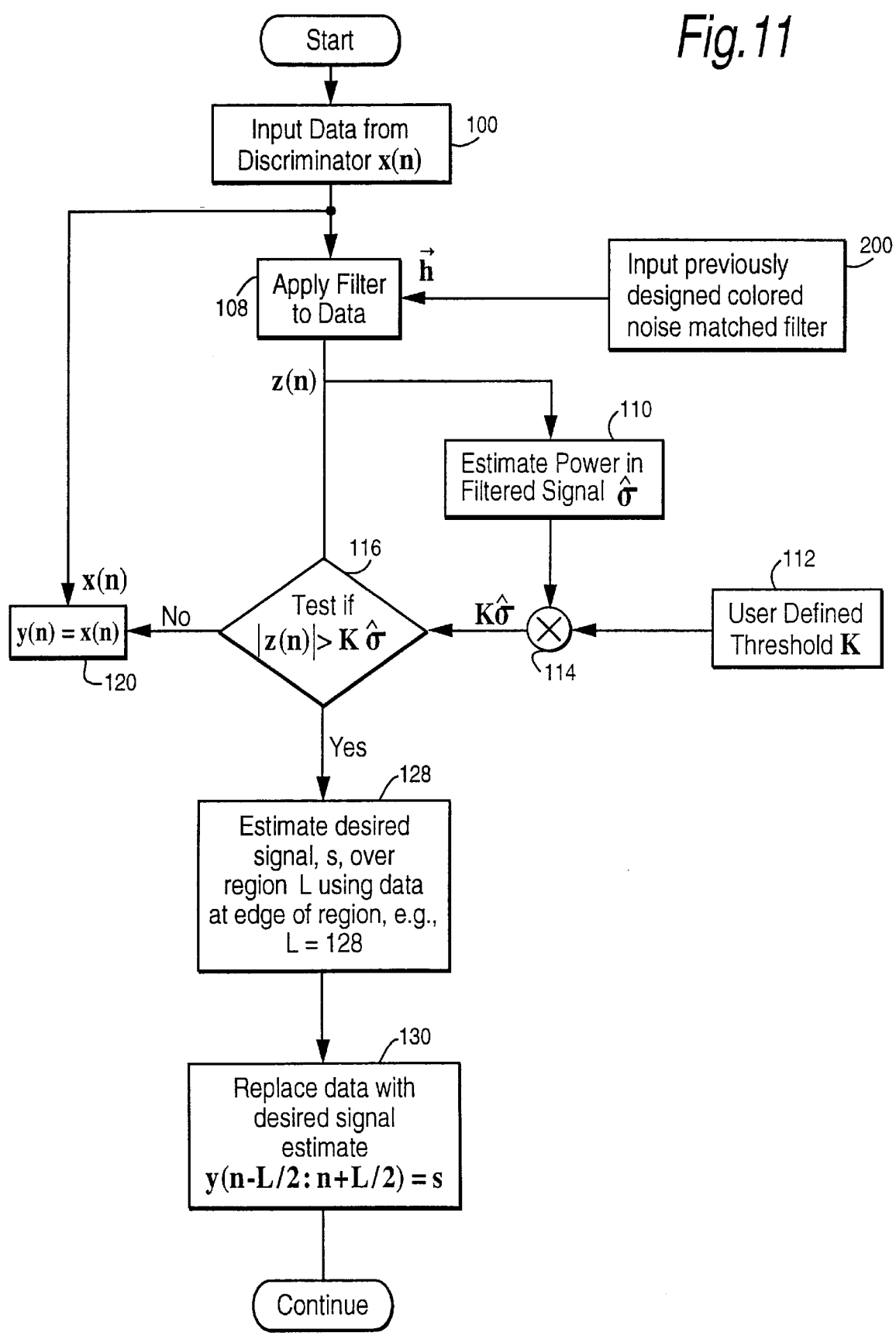
FIG. 11 is a flowchart illustrating a procedure for implementing the present invention in accordance with a simplified example embodiment.

FIG. 11 is a flowchart of another embodiment for implementing the present invention. Like characters, reference numerals, and blocks from FIG. 10 are used to simplify the description. The primary differences between the approaches in FIGS. 10 and 11 is that the colored-noise, matched filter is designed off-line. The estimation of the desired signal characteristics $R_{XX}$ and the design of the colored-noise, matched filter $h=R_{XX}^{-1}c$ based on an average click signature c are performed off-line rather than in real time. This minimizes computational complexity and the drain on signal processing resources. Moreover, when a click is detected, a more conservative interpolation region L such as L=128 is adopted so that the estimated desired signal s(t) is calculated using equation (6) above. The output signal y(t) is determined as indicated in blocks 128 and 130. No edge checking is done to prevent click energy from corrupting the desired signal estimate as a result of a preceding or succeeding click. Only a first order interpolation is used to estimate the desired signal. All of those differences trade off to some degree accuracy for simplicity, speed, and reduced drain on signal processing resources.

In addition to the advantages already noted above, the present invention also provides an excellent alternative to combating multi-path adding as compared to traditional approaches. For example, diversity is sometimes used to ameliorate the effects of fading. But a diversity radio requires that two or more antenna receiver chains be used. This additional hardware adds cost, volume, weight, and complexity to the radio. All of these disadvantages are avoided by the present invention which may if desired be implemented entirely in software.

The foregoing detailed description shows and describes only certain particular embodiments of the present invention. However, those skilled in the art will recognize that many modifications and variations may be made without departing substantially from the spirit and scope of the present invention. Accordingly, it should be clearly understood that the form of the invention herein is exemplary only and is not intended to limit the scope of the invention as defined in the following claims.

What is claimed is:

1. A radio receiver comprising:

an antenna for receiving a radio signal having plural paths;

a signal discriminator for discriminating a desired signal based on a radio signal received by the antenna and generating an output corresponding to the desired signal which includes the desired signal and click noise corresponding to fluctuations in phase of the received radio signal caused by multi-path fading; and a signal processor processing the output generated by the signal discriminator, detecting in the output, multi-path click noise, and substantially reducing or eliminating the detected, multi-path click noise from the output generated by the signal discriminator, wherein the signal processor includes an adaptive filter designed based on a waveform signature of the multi-path click noise and desired signal information obtained from previously received radio signals.

2. The radio receiver in claim 1, wherein the signal processor substantially reduces or eliminates the objectionable click noise without audibly distorting the information in the desired signal.

3. The radio receiver in claim 1, wherein the signal processor substantially reduces or eliminates the objectionable click noise while still substantially preserving the information in the desired signal.

4. The radio receiver in claim 1, wherein the signal processor is an adaptive filter designed based on a waveform signature of the click noise.

5. The radio receiver in claim 1, wherein the desired signal contains both audible and sub-audible information, the radio receiver further comprising:

a low speed data detector connected to the output of the signal processor for detecting the sub-audible information.

6. The radio receiver in claim 5, wherein the signal processor eliminates the multi-path click noise without distorting the audible or the sub-audible information.

7. The radio receiver in claim 1, further comprising:

a frequency converter, coupled to the antenna, for converting a radio frequency signal received over the antenna to an intermediate frequency signal, wherein the intermediate signal generated by the frequency converter is coupled to the signal discriminator.

8. The radio receiver in claim 1, wherein the signal processor is connected to the output of the discriminator.

9. The radio receiver in claim 1, wherein the signal processor includes a colored-noise, matched filter tuned based on a shape of the click noise and characteristics of the desired signal.

10. The radio receiver in claim 9, wherein the colored-noise, matched filter models the desired signal as a slowly varying signal with Gaussian noise added and the click noise is modeled as a high frequency short duration signal with a specific waveform signature.

11. The radio receiver in claim 1, wherein the signal processor sets an adaptive threshold to be exceeded before click noise is detected.

12. A signal processor for processing a radio signal that includes a desired signal and noise created as a result of multi-path fading, comprising:

a filter designed based on characteristics of the desired signal and the multi-path noise for passing frequencies where multi-path noise energy is greater than the desired signal energy and for suppressing frequencies where the desired signal energy is greater than the multi-path noise energy;

a multi-path noise detector detecting when the signal passed by the filter exceeds a threshold; and a signal replacer replacing the detected signal with an estimate of the desired signal.

13. The signal processor in claim 12, wherein the filter is a colored-noise, matched filter designed using characteristics of the multi-path noise and the desired signal.

14. The signal processor in claim 12, wherein the multi-path noise includes click noise and the desired signal includes white noise.

15. The signal processor in claim 12, wherein the signal replacer determines a signal replacement interval based on an estimate of the duration of the detected signal.

16. The signal processor in claim 15, wherein the signal replacer includes a counter for counting when the multi-path noise detector detects when the signal passed by the filter exceeds the threshold, the count value being used to determine the detected signal duration.

17. The signal processor in claim 12, wherein the signal replacer includes an interpolator that interpolates over the duration interval using received signal information preceding and succeeding the duration interval.

18. The signal processor in claim 17, wherein the interpolator determines a slope from the preceding and succeeding received signal information and uses that slope to estimate a smooth transition over the duration interval.

19. The signal processor in claim 12, wherein the threshold is adaptive and is determined as a function of the power of the filter output and a constant.

20. The signal processor in claim 12, wherein the multi-path noise is substantially reduced or eliminated without audibly distorting the information in the desired signal.

21. The signal processor in claim 13, wherein the colored-noise, matched filter models the desired signal as a slowly varying signal with Gaussian noise added and the multi-path noise is modeled as a high frequency short duration signal with a specific waveform signature.

22. A signal processor for processing a radio signal that includes a desired signal and noise created as a result of multi-path fading, comprising:

a filter designed based on characteristics of the desired signal and the multi-path noise for passing frequencies where multi-path noise energy is greater than the desired signal energy and for suppressing frequencies where the desired signal energy is greater than the multi-path noise energy;

a multi-path noise detector detecting when the signal passed by the filter exceeds a threshold; and a signal replacer replacing the detected signal with an estimate of the desired signal, wherein the signal replacer checks the signal replacement interval to determine if the interval begins or ends in detected multi-path noise, and if so, the signal replacer enlarges the replacement interval.

23. A signal processing method comprising the steps of:

receiving a radio signal modulated with desired information;

detecting from the received radio signal a detected signal that includes the desired information;

filtering the detected signal to detect noise caused by phase fluctuations in the received radio signal included in the detected signal using signal characteristics of both the noise and the desired information;

comparing the filtered signal with a threshold; and if the filtered signal exceeds the threshold, replacing a portion of the detected signal with an estimate of the desired information for the portion of the detected signal being replaced.

24. The signal processing method in claim 23, wherein if the filtered signal does not exceed the threshold, the portion of the detected signal is not replaced.

25. The signal processing method in claim 23, further comprising:

adapting the threshold to the received signal based on the power of the filtered signal and a constant.

26. The signal processing method in claim 23, further comprising:

estimating as a covariance matrix $R_{xx}$ the signal characteristics of the desired signal using previously analyzed signals having desired information;

estimating as a vector matrix c a waveform signature of the noise using an average of previously analyzed noise signals; and designing a filter h for performing the filtering step in accordance with the following:

$$h = R_{xx}^{-1} c.$$

27. The signal processing method in claim 23, further comprising:

substantially reducing or eliminating the noise while still substantially preserving the desired information.

28. The signal processing method in claim 23, further comprising:

modeling the desired information as a slowly varying signal with Gaussian noise added and the noise as a high frequency short duration signal with a specific waveform signature.

29. The signal processing method in claim 23, further comprising:

determining a variable signal replacement interval for a filtered signal that exceeds the threshold.

30. The signal processing method in claim 29, further comprising:

counting when the signal passed by the filter exceeds the threshold, the count value being used to determine a duration of the signal replacement interval.

31. The signal processing in claim 29, further comprising:

interpolating over the signal replacement interval using received signal information preceding and succeeding the signal replacement interval.

* * * * *